United States Patent [19]

Sato

[11] Patent Number: 5,161,017
[45] Date of Patent: Nov. 3, 1992

[54] GHOST CANCELLATION CIRCUIT

[75] Inventor: Takashi Sato, Tokyo, Japan

[73] Assignee: U.S. Philips Corporation, New York, N.Y.

[21] Appl. No.: 676,927

[22] Filed: Mar. 28, 1991

[30] Foreign Application Priority Data

Apr. 4, 1990 [JP] Japan .................................. 2-90038
Apr. 4, 1990 [JP] Japan .................................. 2-90039

[51] Int. Cl.$^5$ .................... H04N 5/21; H04N 9/64; H04N 5/208
[52] U.S. Cl. ...................................... 358/166; 358/37
[58] Field of Search .................... 358/166, 167, 36, 37

[56] References Cited

U.S. PATENT DOCUMENTS

| | | | |
|---|---|---|---|
| 4,404,600 | 9/1983 | Murakami | 358/167 |
| 4,476,491 | 10/1984 | Murata et al. | 358/167 |
| 4,583,120 | 4/1986 | Murakami et al. | 358/166 |
| 5,065,241 | 11/1991 | Iga | 358/166 |

FOREIGN PATENT DOCUMENTS 1-17978  5/1991  Japan .
2-53177  11/1991  Japan .

Primary Examiner—James J. Groody
Assistant Examiner—Glenton B. Burgess
Attorney, Agent, or Firm—Michael E. Marion

[57] ABSTRACT

A ghost cancellation circuit has serially connected non-recursive and recursive filters. The circuit first calculates filter coefficients for the non-recursive filter based on a received ghost cancellation reference (GCR) signal and a GCR signal previously stored in this circuit. The calculated coefficients are set to the non-recursive filter. Then, time-series data of an output of the non-recursive filter with regard to the received GCR signal are set to the recursive filter as its filter coefficients.

7 Claims, 5 Drawing Sheets

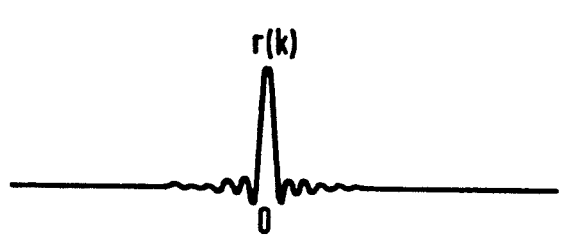
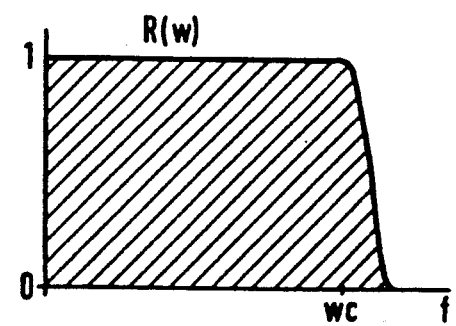
FIG.3a              FIG.3b
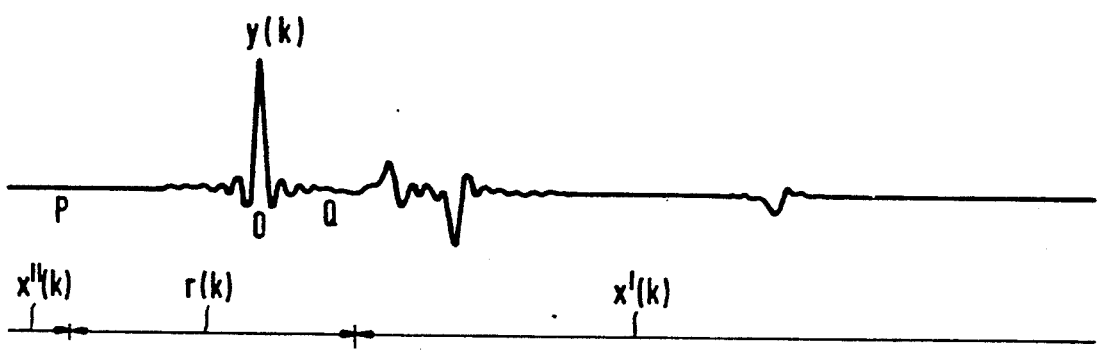
FIG.4
FIG.5

GHOST CANCELLATION CIRCUIT

BACKGROUND OF THE INVENTION

This invention relates generally to ghost cancellation circuits for eliminating ghost interferences in television systems and more particularly to such a ghost cancellation circuit which operates at a very high speed.

There has been proposed a ghost cancellation circuit which cancels ghosts in a received television signal with the aid of a ghost cancellation reference signal having a waveform of sin x/x at its leading edge (hereinafter referred to as "GCR signal") to thereby obtain a high picture quality.

A ghost cancellation circuit of this kind generally comprises a finite impulse response (FIR) filter (or a non-recursive filter) for mainly canceling nearby ghosts and an infinite impulse response (IIR) filter (or a recursive filter) for mainly canceling normal ghosts.

Conventionally, with the ghost cancellation circuit having such a structure, respective filter coefficients for an FIR filter and an IIR filter are calculated by means of a microprocessor or the like based on a received GCR signal, which may temporarily be stored in a memory, and a GCR signal previously stored in its circuit. The filter coefficients (i.e., the coefficients for filter taps) are then set to the filters, whereafter a received television signal is passed through the filters to thereby cancel its ghosts. In this case, the filter coefficients for the FIR filter can be calculated based on the received television signal in the following manner. First, the frequency characteristic of the received GCR signal is calculated by means, for example, of the fast Fourier transformation (FFT). The frequency characteristic of the known GCR signal is then divided by the above calculated frequency characteristic, and the result of this division is subjected to an inverse FFT to thereby obtain the filter coefficients. Alternatively, the least square method may be used. More specifically, the filter coefficients are calculated by means of the least square method based on the waveform of the received GCR signal and that of the known GCR signal. Filter coefficients for the IIR filter can also be calculated in a manner described above for the FIR filter. In order to achieve a sufficient ghost cancellation, however, several tens of filter coefficients must be calculated for the FIR filter and hundreds of filter coefficients for the IIR filter. Although the calculation of the filter coefficients for the FIR filter can be done in a relatively short time, that for the IIR filter takes a substantial time, which has been a bar against the fast operation of this kind of ghost cancellation circuit.

In the above calculation, if the waveform of the received GCR signal contains high-frequency noises, the filter coefficients for the FIR and IIR filters calculated based on this received GCR signal become inaccurate, which results in an insufficient cancellation of ghosts.

It is therefore an object of the invention to provide a ghost cancellation circuit comprising an FIR filter and an IIR filter which operates at a higher speed, that is to say, a ghost cancellation circuit in which the filter coefficients can be set to these filters in a reduced time.

It is another object of the invention to provide a ghost cancellation circuit which can cancel ghosts in the received television signal more accurately.

SUMMARY OF THE INVENTION

A ghost cancellation circuit according to a first aspect of the invention is characterized by comprising a first memory for storing a received ghost cancellation reference signal contained in an input video signal; a second memory in which a predetermined ghost cancellation reference signal has been stored; calculating means for calculating a first group of filter coefficients for the non-recursive filter based on the received ghost cancellation reference signal stored in the first memory and the predetermined ghost cancellation reference signal stored in the second memory, and for setting the first group of filter coefficients to the non-recursive filter; filtering means for causing the received ghost cancellation reference signal to be passed through the non-recursive filter, to which the first group of filter coefficients have been set, to thereby obtain a filtered ghost cancellation reference signal; and setting means for setting, as a second group of filter coefficients, values corresponding respectively to time-series data representative of the filtered ghost cancellation reference signal to the recursive filter with the corresponding time relation.

With this structure, the setting of the filter coefficients to the recursive filter is effected only with the values corresponding to the time-series data of the output of the non-recursive filter without any complex calculations and can therefore be done within a very short time.

Before calculating the filter coefficients for the non-recursive filter, the received ghost cancellation reference signal may be formed by averaging a plurality of received ghost cancellation reference signals so that the coefficients are more accurate.

According to another aspect of the invention, a ghost cancellation circuit is characterized by comprising a first memory for storing a received ghost cancellation reference signal contained in an input video signal; a second memory in which a predetermined ghost cancellation reference signal has been stored; first calculation means for calculating a first group of filter coefficients for the non-recursive filter based on the received ghost cancellation reference signal stored in the first memory and the predetermined ghost cancellation reference signal stored in the second memory, and for setting the first group of filter coefficients to the non-recursive filter; second calculation means for calculating an output of the non-recursive filter, to which the first group of filter coefficients have been set, relative to the received ghost cancellation reference signal based on the received ghost cancellation reference signal and the first group of filter coefficients; and setting means for setting, as a second group of filter coefficients, values corresponding respectively to time-series data representative of the calculated output of the non-recursive filter to the recursive filter with the corresponding time relation.

With this structure, the setting of the filter coefficients to the recursive filter can also be done in a very short time with the use of the calculated output of the non-recursive filter.

According to a further aspect of the invention, a ghost cancellation circuit is characterized by comprising a first memory disposed on the output side of the non-recursive filter for storing a received ghost cancellation reference signal contained in an input video signal passed through the non-recursive filter; a second memory in which a predetermined ghost cancellation reference signal has been stored; a third memory in which a first group of filter coefficients for giving the non-recursive filter a low-pass filtering characteristic, which substantially corresponds to a frequency characteristic of the predetermined ghost cancellation reference signal, have been stored; first setting means for setting the first group of filter coefficients to the non-recursive filter in synchronism with a timing at which the received ghost cancellation reference signal appears in the input video signal; calculation means for calculating a second group of filter coefficients for the ghost cancellation in the non-recursive filter and a third group of filter coefficients for the ghost cancellation in the recursive filter based on the received ghost cancellation reference signal stored in the first memory and the predetermined ghost cancellation reference signal stored in the second memory; and setting means for setting the second group of filter coefficients and the third group of filter coefficients to the non-recursive filter and the recursive filter, respectively.

With this structure, high-frequency noises can be removed from the received ghost cancellation reference signal, based on which the filter coefficients for the non-recursive and recursive filters are calculated, without the need for any additional circuit or processing means. It is therefore possible to render the ghost cancellation operation more accurate with a simpler construction and less costs.

Embodiments of the present invention will now described, by way of example, with reference to the accompanying drawings in which:

FIG. 3(a) is an illustration showing a waveform of a ghost cancellation reference signal previously stored in a memory of a ghost cancellation circuit according to the invention;

FIG. 3(b) is an illustration showing a frequency characteristic of the ghost cancellation reference signal of FIG. 3(a);

FIG. 4 is an illustration showing a waveform of the received ghost cancellation reference signal which has passed a non-recursive filter;

FIG. 5 is an illustration showing a waveform of the received ghost cancellation signal which a ghost cancellation circuit according to the invention outputs;

First, the principle of the invention will be described.

Figure 1:
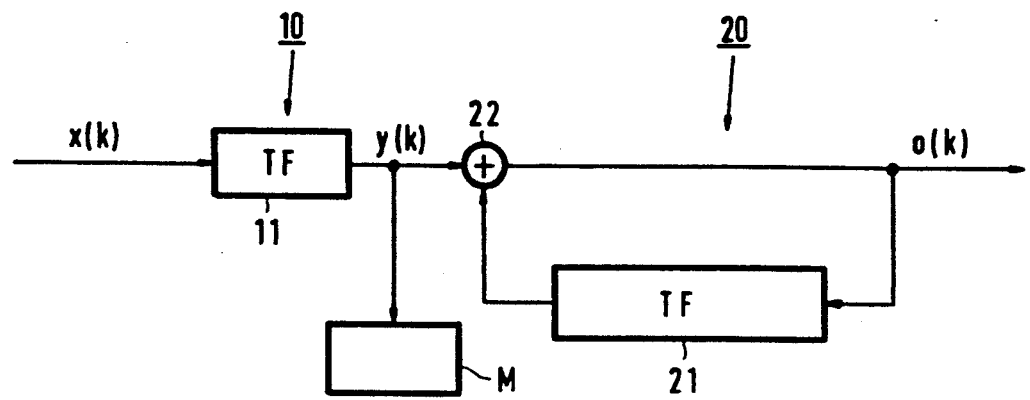
FIG. 1 is a block diagram of a ghost cancellation circuit for explaining the principle of the present invention.

FIG. 1 shows a cascade connection of a finite impulse response (FIR) filter and an infinite impulse response (IIR) filter in a ghost cancellation circuit according to the invention, wherein such connection of two filters itself has been known. In FIG. 1, the FIR filter 10 is composed of a transversal filter (TF) 11, while the IIR filter 20 comprises a transversal filter 21 in its feedback path and an adder 22 to which an output of the FIR filter 10 is applied. On the output side of the FIR filter 10, there may be provided a memory M which has a capacity sufficiently large for storing video information of at least one horizontal line.

Filter coefficients for the FIR filter 10 (hereinafter referred to as "FIR filter coefficients") are calculated in the conventional manner. More specifically, the respective FIR filter coefficients are calculated, by means of the least square method or the algorithm employing FFT, based on time-series information x(k) of a sin x/x signal in a ghosted GCR signal supplied as an input signal to this circuit and time-series information r(k) of a GCR signal previously stored in this circuit.

The above ghosted GCR signal may be collected as follows. First, filter coefficients for a low-pass filter, which has a frequency characteristic substantially corresponding to that of the sin x/x signa in the GCR signal (in practice, a frequency characteristic having a cut-off frequency at around 4.2 MHz), are set to the FIR filter 10 when the waveform of the ghosted GCR signal in the received video signal is stored in the memory M. Thus, the received GCR signal is stored in the memory M with its high-frequency noises being reduced.

The aforesaid calculated FIR filter coefficients are set to the transversal filter 11 of the FIR filter 10. Then, an output signal y(k) of the FIR filter 10 with the calculated coefficients is obtained with regard to the signal x(k). This time-series data y(k) is set to the IIR filter 20 without performing any operation thereon. More specifically, respective values of the time-series data y(k) are set to the IIR filter 20 with the corresponding time relation.

The reason why it is possible to eliminate ghost interferences by the setting of the output signal y(k) of the filter 10 to the IIR filter 20 will be described hereinafter.

Figure 2:
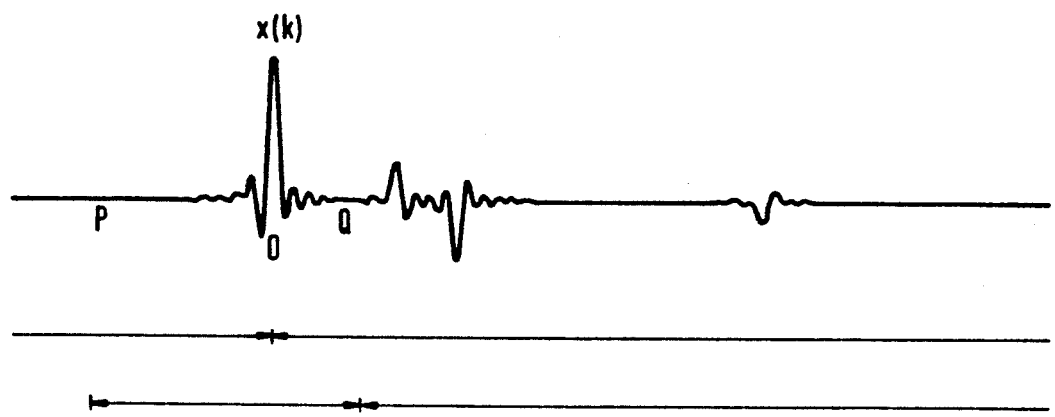
FIG. 2 is an illustration showing a waveform of a received ghost cancellation reference signal which has been subjected to ghost interferences.

For the sake of simplicity, a ghost cancellation is assumed to be a filtering operation by which a reference sin x/x signal r(k) shown in FIG. 3(a) is reproduced from the ghosted sin x/x signal x(k) of which waveform is shown, for example, in FIG. 2. A frequency characteristic R(w) of the signal r(k) is flat from DC to a frequency $w_c$ of 4.2 MHz and exhibits a steep attenuation to zero above this frequency as shown in FIG. 3(b).

As shown in FIG. 2, the signal x(k) contains pre-ghosts on the upstream side of a reference point Q thereof in terms of time and delayed ghosts on the downstream side. Filter coefficients h(k) for the FIR filter 10 are selected such that they act on the part of the signal x(k) which includes the pre-ghosts and side lobes of the reference signal r(k), i.e., the range P–Q shown in FIG. 2, and that the signal y(k) shown in FIG. 4 which is the signal x(k) after passing through the FIR filter 10 meets within this range:

$$y(k) = r(k) \text{ where } P <= k <= Q \quad (1)$$

In this case, the output y(k) of the FIR filter 10 is expressed as:

$$y(k) = \sum_{i=P}^{Q} h(i)x(k-i) \quad (2)$$

From the above equation (1), it is appreciated that the FIR filter coefficients should have the following relation:

$$[R] = [H][X] \tag{3}$$

where $$[R] = [r(P) \quad r(P+1) \ldots r(Q)]$$

$$[H] = [h(P) \quad h(P+1) \ldots h(Q)]$$

$$[X] = \begin{bmatrix} x(0) & x(1) & \ldots & x(Q-P) \\ x(-1) & x(0) & \ldots & . \\ . & . & \ldots & . \\ . & . & \ldots & . \\ x(P-Q) & . & \ldots & x(0) \end{bmatrix}$$

Therefore, the FIR filter coefficients h(k) can be obtained by calculating:

$$[H] = [R][X]^{-1} \tag{4}$$

where $[X]^{-1}$ is an inverse matrix of [X].

However, since the calculation for obtaining the inverse matrix of [X] is very complex, the FIR filter coefficients are normally calculated by means, for example, of an adaptive method such as the least square method or of an algorithm employing the FFT.

After the FIR filter coefficients h(k) have been thus calculated and set to the FIR filter 10, the ghosted sign x/x signa, i.e., the signal x(k), is passed through this FIR filter 10. In this case, that portion of the output signal y(k) which corresponds to the aforesaid range P-Q should substantially be equal to the reference signal r(k). The signal y(k) can therefore be expressed as:

$$y(k) = X''(k) + r(k) + x'(k) \tag{5}$$

or $$y(k) = \begin{cases} x''(k) & (k < P) \\ r(k) & (P <= k <= Q) \\ x'(k) & (Q < k) \end{cases}$$

and its waveform is shown in FIG. 4. In the above equations, x''(k) represents the residual ghosts on the upstream side of the point P, and x'(k) the residual ghosts on the downstream side of the point Q.

Then, time-series data representative of an inverted signal of the signal x'(k), i.e., the signal −x'(k), are set to the IIR filter 20 as its filter coefficients with the corresponding time relation. As a result, that part of the signal y(k) of FIG. 4 which corresponds to the signal x'(k) is canceled, so that an output signal o(k) of the IIR filter 20 is substantially equal to r(k) as expressed in the following equation and will be appreciated from its waveform shown in FIG. 5:

$$o(k) \approx r(k) \tag{6}$$

The above ghost cancellation operation can be verified as follows:

When an output Y(w) of the FIR filter 10 is passed through the IIR filter 20 having a feedback frequency characteristic of −X'(w), an output O(w) of this filter 20 can be expressed as:

$$O(w) = Y(w) - X'(w)O(w) \tag{7}$$

Therefore, the following is established:

$$O(w) = \frac{Y(w)}{1 + X'(w)} = \frac{X''(w) + R(w) + X'(w)}{1 + X'(w)} \tag{8}$$

As described earlier, the filter coefficients for the FIR filter 10 have been selected so as to cover the pre-ghosts in the range 0–P, so that X''(w) in the above equation (8) is negligibly small with respect to R(w). The equation (8) can therefore be converted to:

$$O(w) = \frac{R(w) + X'(w)}{1 + X'(w)} \tag{9}$$

Since the frequency characteristic R(w) assumes "1" within its frequency band as shown in FIG. 3(b), the above equation (9) can be expressed in two split ranges as:

$$R(w) = R_L(w) = 1 \quad (w < W_c) \tag{10}$$

$$R(w) = R_H(w) \quad (w_c <= w)$$

where Wc is the frequency at which R(w) starts decreasing from "1".

The portion $O_L(w)$ of the output O(w) of which frequencies are lower than the frequency $w_c$ ($w < w_c$) is expressed as:

$$\begin{aligned} O_L(w) &= \frac{R_L(w) + X'_L(w)}{1 + X'_L(w)} \\ &= \frac{1 + X'_L(w)}{1 + X'_L(w)} \\ &= 1 = R_L(w) \end{aligned} \tag{11}$$

Thus, that portion of O(w) whose frequency is lower than $w_c$ is equal to the lower frequency portion of R(w) and is flat.

On the other hand, the portion $O_H(w)$ of the output O(w) of which frequencies are higher than the frequency $w_c$ ($w_c <= w$) is expressed as:

$$O_H(w) = \frac{R_H(w) + X_H(w)}{1 + X'_H(w)} \tag{12}$$

where X'H(w) is the higher frequency portion of X'(w) or of the frequency characteristic of the residual ghost signal x'(k). This equation (12) indicates that the smaller $X'_H(w)$ is, the more $O_H(w)$ approaches $R_H(w)$. $O_H(w)$ can therefore be deemed as being substantially equal to $R_H(w)$ unless the received signal contains significantly large ghosts.

Thus, according to the above-described method of setting filter coefficients the lower frequency portion of the output O(w) of this ghost cancellation circuit is rendered substantially equal to the lower frequency portion of R(w), while the higher frequency portion of O(w) being very close to the higher frequency portion of R(w).

Embodiment Employing Ordinary CPU

A first embodiment of the ghost cancellation circuit according to the invention which comprises an ordinary microprocessor will now be described with reference to FIG. 6.

Figure 6:
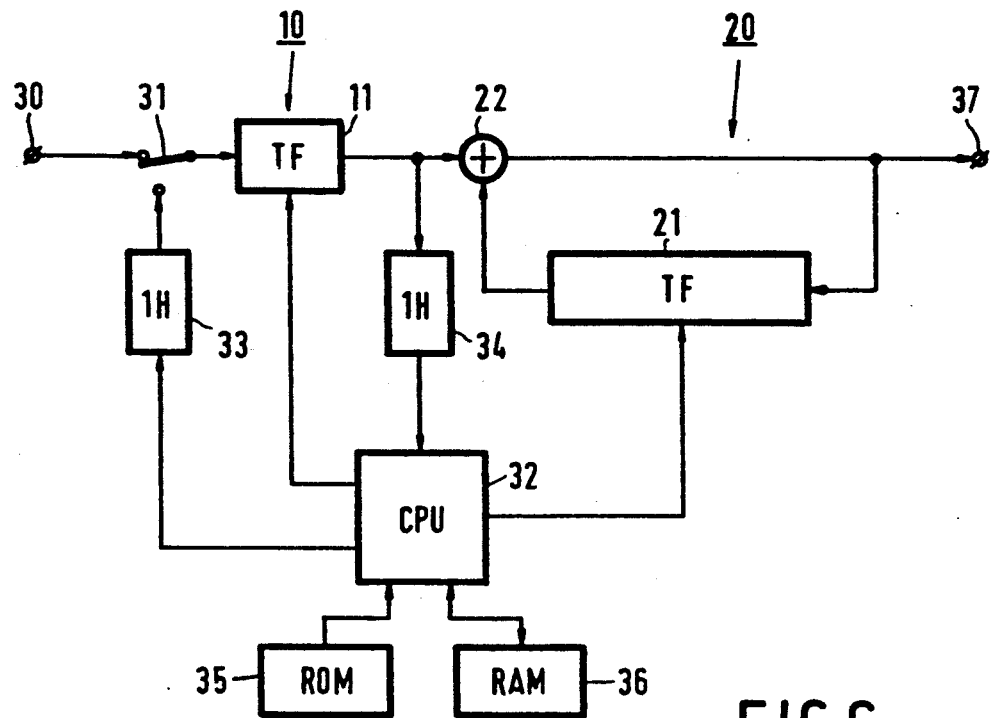
FIG. 6 is a block diagram of a first embodiment of the invention.

In FIG. 6, an FIR filter 10 and an IIR filter 20 provided in this ghost cancellation circuit have the same structures as those shown in FIG. 1. A switch 31 is provided between an input terminal of a transversal filter 11 constituting the FIR filter 10 and a signal input terminal 30 of this ghost cancellation circuit. The signal input terminal 30 is supplied sequentially with video signals which are obtained from an input video signal by sampling at a predetermined sampling frequency and digitizing. The switch 31 is constituted, for example, by a multiplexer and supplies to the input terminal of the FIR filter 10 the video signals at the input terminal 30 or an output of a buffer memory 33, which has a capacity for storage of video signals of one line, under the control of a microprocessor 32 which will later be described. An output of the transversal filter 11 is supplied to an adder 22 in the IIR filter 20 as well as to a waveform collection memory 34 which has a capacity for storage of video signals of at least one line. An output terminal of this waveform collection memory 34 is connected to an input bus of the microprocessor 32. This microprocessor is connected to a ROM 35, storing programs for performing operations and controls and reference data or the like, and to a RAM 36 for temporarily storing intermediate data. The ROM 35 may also store therein filter coefficients for a low-pass filter having a frequency characteristic corresponding to that of the sin x/x signal. An output bus of the microprocessor 32 is connected to an input terminal of the buffer memory 33 and to filter coefficient input terminals of the transversal filters 11 and 21. A video signal obtained at a signal output terminal 37 of this ghost cancellation circuit, which is connected to an output terminal of the IIR filter 20, is converted, for example, into an analog signal and is then supplied to a not-shown picture display circuit or the like.

With the above structure, the microprocessor 32 first brings the switch 31 into the state shown in FIG. 6, for example, immediately before the eighteenth horizontal period in each field (18H or 281H) and also sets filter coefficients, previously stored in the ROM 35 for the predetermined low-pass filtering, to the transversal filter 11 at its respective stages. As a result, the video signals for example of 18H or 281H received by the filter 11 through the terminal 30 are stored from this filter into the waveform collection memory 34 with high-frequency noise components thereof being removed. In this case, values "0" may be used as the filter coefficients for the filter 11 instead of the above coefficients for the low-pass filtering so that the video signals received at the terminal 30 are stored through the transversal filter 11 into the waveform collection memory 34 in the same form as they were received. The microprocessor 32 then returns the filter coefficients for the filter 11 to the previous values, and reads the contents of the memory 34 at a predetermined timing to store the same into the RAM 36. The microprocessor 32 carries out the above operation in accordance, for example, with the eight-field sequence method complying with the BTA (Broadcasting Technology Association) standard and reproduces the GCR signal (time-series information) of the received video signals based on the data thus formed in the RAM 36. The microprocessor 32 differentiates this GCR signal after subjecting it to a necessary signal processing to obtain a sin x/x signal corresponding to the leading edge portion of the GCR signal, i.e., a time series x(k) of the ghosted sin x/x signal shown in FIG. 2, which is temporarily stored in the RAM 36 The microprocessor 32 then calculates filter coefficients h(k) for the FIR filter by means of the least square method based on the above signal x(k) contained in the RAM 36 and a time series r(k) of the reference sin x/x signal previously stored in the ROM 35 and shown in FIG. 3(a).

The microprocessor 32 then reads the signal x(k) out of the RAM 36 and stores the same into the buffer memory 33. The microprocessor 32 also sets the filter coefficients h(k) to the respective stages of the transversal filter 11 during the relevant vertical blanking period and at the same time changes over the switch 31 so that the signal x(k) in the buffer memory 33 is supplied to the transversal filter 11. In this case, the output of the transversal filter 11 with regard to the above signal x(k), that is to say the signal y(k) shown in FIG. 4, is stored in the waveform collection memory 34. When the above operation has been completed, the microprocessor 32 return the switch 31 to the shown state.

The microprocessor 32 then reads, from the waveform memory 34, that portion of the signal y(k) which follows the point Q, i e , the signal portion in the residual ghost region represented by x'(k), and sets values of this time-series x'(k) with their signs being changed to the respective stages of the transversal filter 21 with the corresponding time relation.

With the above-described structure, the output o(k) of this ghost cancellation circuit, which is obtained at the signal output terminal 37 with regard to the ghosted sin x/x signal x(k), is thus substantially equal to the reference sin x/x signal r(k) shown in FIG. 5, which means that the video signal obtained at the terminal 37 is the received video signal of which the ghost interference has been eliminated substantially completely.

Embodiment Employing Digital Signal Processor

Figure 7:
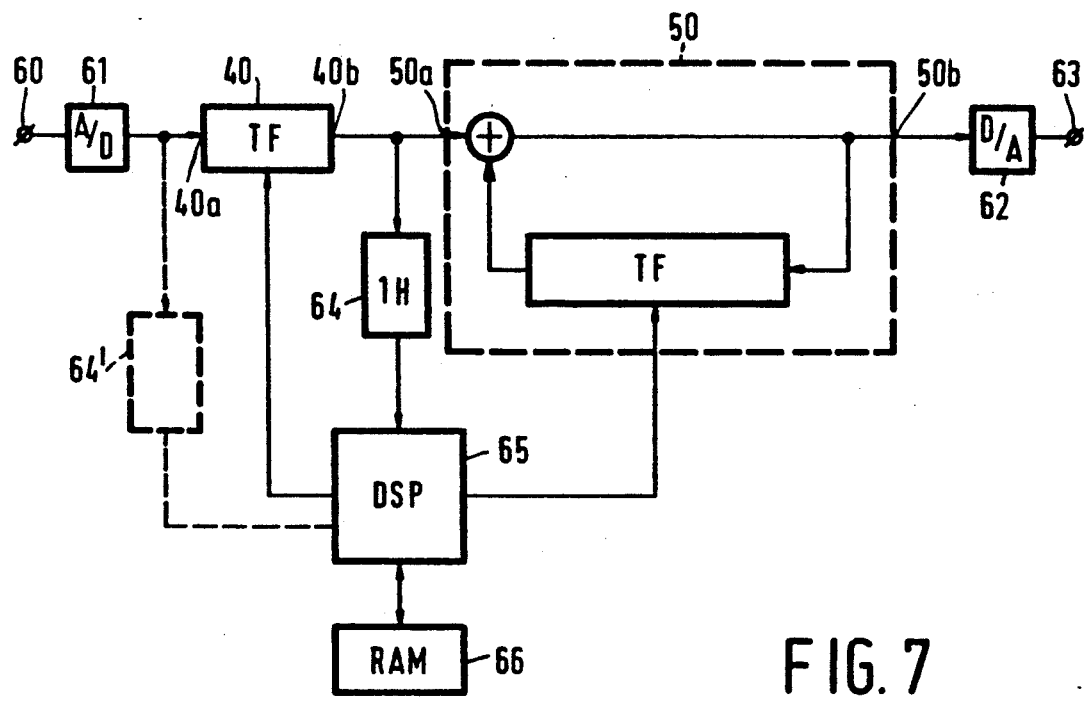
FIG. 7 is a block diagram of a second embodiment of the invention.

A second embodiment of the ghost cancellation circuit according to the invention will now be described, FIG. 7 shows a ghost cancellation circuit according to the invention of which operation speed has been increased by the use of a digital signal processor (hereinafter referred to as "DSP"). An FIR filter 40 and an IIR filter 50 are serially connected in the same manner as those shown in FIG. 6. An input terminal 40a of the FIR filter 40 is supplied sequentially with digital data each, for example, of eight bit which have been obtained by converting an analog video signal received at a signal input terminal 60 by an A/D converter 61 at a predetermined sampling interval. From an output terminal 50b of the IIR filter 50, filtered video signals each, for example, of eight bit are sequentially supplied to a D/A converter 62 from which the video signals are supplied to an output terminal 63 as an analog signal. A signal line between an output terminal 40b of the FIR filter 40 and an input terminal 50a of the IIR filter 50 is connected to an input terminal of a line memory 64 which has a capacity sufficiently large for storing video signals within one horizontal line period. This line memory has an output terminal connected to an input bus of a DSP 65. The DSP 65 is, for example, of the type TMS320C25 of Texas Instruments Inc. which has such a high speed that a multiplication, an addition and a data fetch operation can simultaneously be performed within one cycle and also has an on-the-chip ROM for storing programs, data and the reference sin x/x signal. This ROM may also store therein filter coefficients LPF(k) for a low-pass filter having a frequency characteristic corresponding to that of the sin x/x signal. This DSP is further connected to a RAM 66 which is provided for storing temporary data and for the use as a working area. An output bus of the DSP 65 is connected to filter coefficient input terminals of the FIR filter 40 and the IIR filter 50 and to other portions in this circuit.

Figure 8:
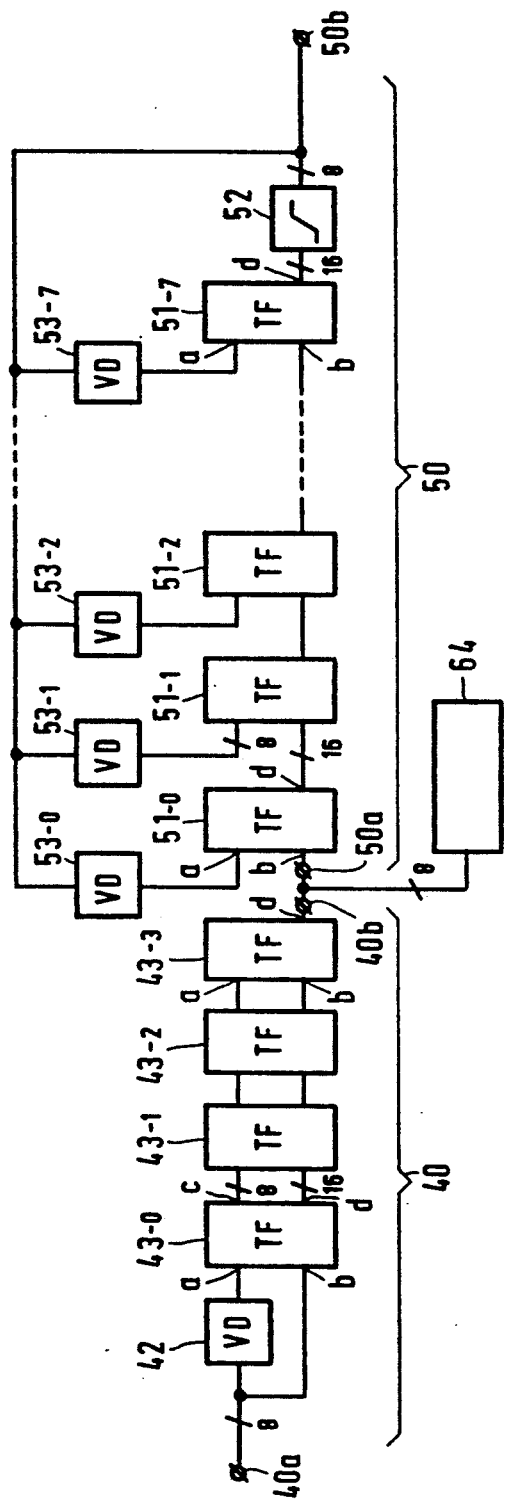
FIG. 8 is a detailed block diagram of the FIR and IIR filters in the embodiment of FIG. 7.

The FIR filter 40 comprises, as shown in FIG. 8, a variable delay element 42 which delays each input video signal for a time period set by the DSP 65, a transversal filter 43-0 which receives an output of the variable delay element 42 and the input video signal respectively at its terminals a and b, and three transversal filters 43-1, 43-2 and 43-3 connected in a cascade fashion and connected to the transversal filter 43-0 via terminals c and d of the latter. The transversal filters 43-0, 43-1, 43-2 and 43-3 have an identical construction which is shown in detail in FIG. 9.

Figure 9:
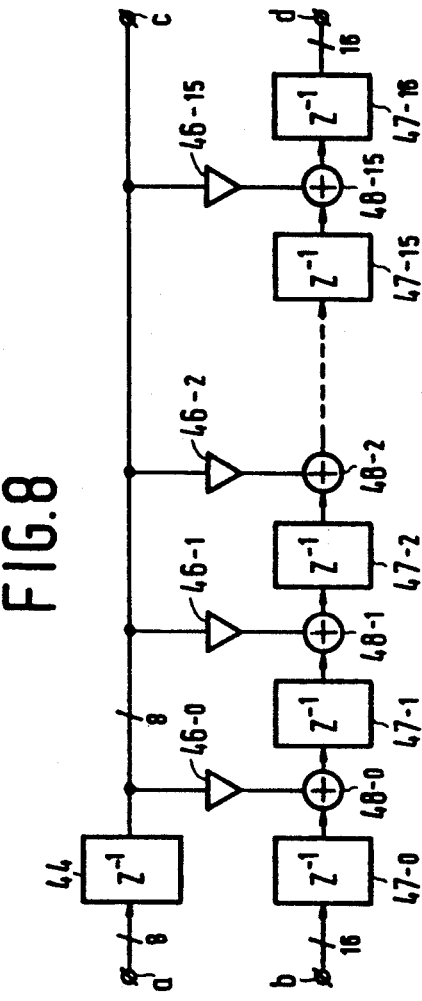
FIG. 9 is a detailed block diagram of one of the transversal filters constituting the FIR and IIR filters.

As shown in FIG. 9, each transversal filter comprises a delay element 44 of one clock period whose input terminal is connected to an (eight-bit) input terminal a of this transversal filter. An output terminal of the delay element 44 is connected to input terminals of sixteen multipliers 46-0, 46-1, 46-2, ..., 46-15 and to an output terminal c of this transversal filter. The multipliers 46-0, 46-1, 46-2, ..., 46-15 are supplied, by the DSP 65, with filter coefficients as their multiplication factors. Between further (sixteen-bit) input and output terminals b and d of this transversal filter, seventeen one-clock delay elements 47-0, 47-1, 47-2, ..., 47-16 are provided in a cascade fashion with adders 48-0, 48-1, 48-2, 48-3, ..., 48-15 being interposed respectively therebetween. Outputs of the multipliers 46-0, 46-1, 46-2, ..., 46-15 are supplied to input terminals of the adders 48-0, 48-1, 48-2, 48-3, ..., 48-15, respectively.

Referring again to FIG. 8, the output terminal 40b of the FIR filter 40, i.e., an output terminal d of the transversal filter 43-3, is connected to the input terminal of the line memory 64 and to the input terminal 50a of the IIR filter 50. This input terminal 50a is connected to an input terminal b of a transversal filter 51-0 which is connected to further transversal filters 51-1, 51-2, ..., 51-7 arranged in a cascade fashion. In this case, each of the above transversal filters 51-0, 51-1, 51-2, ..., 51-7 has the same structure as that shown in FIG. 9. An output terminal d of the last transversal filter 51-7 is connected to the output terminal 50b of the IIR filter 50 through a limiter 52 which reduces the number of bits of the input information from sixteen to eight. The output of the limiter 52 is also fed back to input terminals a of the transversal filters 51-0, 51-1, 51-2, ..., 51-7 via variable delay elements 53-0, 53-1, 53-2, ..., 53-7, respectively. In this case, the variable delay elements 53-0, 53-1, 53-2, ..., 53-7 are loaded with delay factors by the DSP 65.

The operation of this embodiment having the above structure will now be described with reference to a flow chart shown in FIG. 10.

Figure 10:
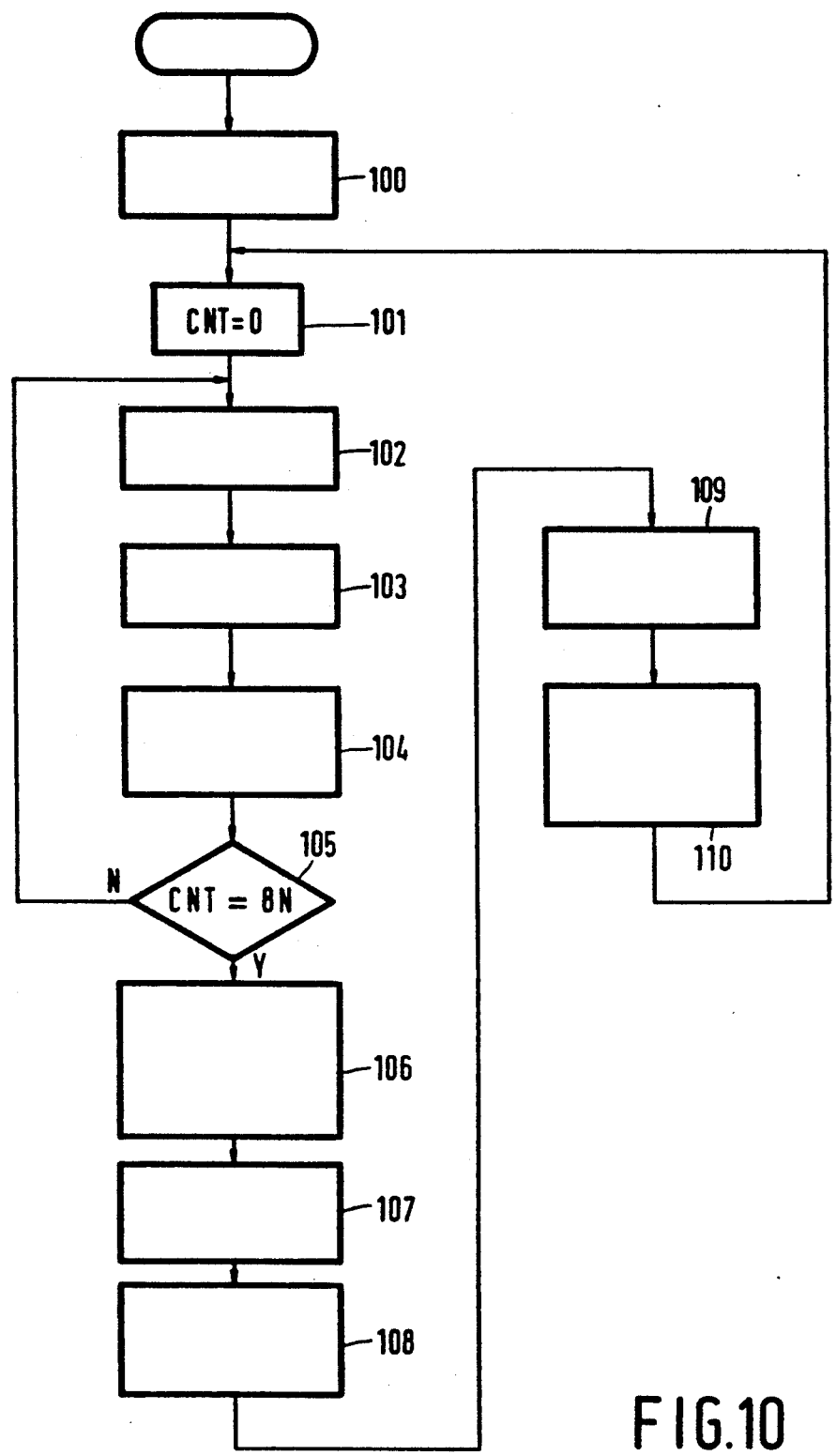
FIG. 10 is a flow chart showing the operation of the embodiment of FIG. 7.

Upon detection of a trailing edge of the vertical synchronization signal in an odd field of the received video signal by a not-shown circuit, the program shown in FIG. 10 starts with initialization processing at Block 100. In Block 100, "0" are set to the FIR filter 40 and the IIR filter 50 as filter coefficients therefor. More specifically, the DSP 65 sets "0" to the respective multipliers 46-0 to 46-15 in each of the transversal filters 43-0 to 43-3 and 51-0 to 51-7 as the multiplication factors thereof. The DSP 65 then sets "0" to a counter CNT in Block 101, and proceeds to Block 102. In Block 102, the low-pass filter coefficients LPF(k) previously stored in the on-the-chip ROM of the DSP 65 are set to the FIR filter 40 as its filter coefficients. Then, data stored in the line memory 64, that is to say, the GCR signal (or the pedestal signal) whose high-frequency noises have been removed by the filter 40 in accordance with the above low-pass filter coefficients LPF(k), is stored in the RAM 66 in Block 103. In the next Block 104, the respective filter coefficients in the FIR filter 40 are returned to the filter coefficients of immediately before the Block 102 and "1" is added to the counter CNT. It is then determined at Block 105 whether the value in the counter CNT has reached, for example, "8N" which is a multiple of "8". If it has not yet reached, the processing returns to Block 102, whereas if it has reached the processing proceeds to the next Block 106. More specifically, the GCR signals and the pedestal signals of a multiple of eight consecutive fields are collected in Blocks 102 to 105 so that the eight-field sequence method of the BTA standard can be used, for example. In Block 106, the GCR signals and the pedestal signals thus collected are subjected to a processing according to the eight-field sequence method to thereby obtain the averaged GCR signal. Furthermore, a difference between the thus obtained GCR signal and a signal one clock shifted from the GCR signal is formed (i.e., the GCR signal is differentiated) to obtain the ghosted sin x/x signal x(k). The signal x(k) is then stored in the RAM 66.

In the next Block 107, filter coefficients h(k) for the FIR filter 40 are calculated by means of the least square method from the above-described signal x(k) stored in the RAM 66 and the time-series information r(k) of the reference sin x/x signal previously stored in the on-the-chip ROM of the DSP 65. These filter coefficients h(k) {hereinafter referred to as "filter coefficients fir(k)"} are sixty four in number and temporarily stored in the RAM 66. In Block 108, the portion x'(k) of the signal y(k), which will be outputted from the FIR filter to which the filter coefficients fir(k) have been set and to which the signal x(k) is supplied, is calculated based on the signal x(k) in the RAM 66 and the fir(k). More specifically, the DSP 65 obtains with regard to those "k"s following the point Q in FIG. 4:

$$\sum_{i=P}^{Q} fir(i)x(k-i)$$

The data x'(k) thus obtained are temporarily stored in the RAM 66. In the next Block 109, the DSP 65 detects a predetermined number (eight in this embodiment) of peaks of the data x'(k), and extracts for each peak a predetermined number (sixteen in this case) of those consecutive data of x'(k) of which center corresponds to the relevant peak. These data are to be used as filter coefficients for the IIR filter 50 and will hereinafter be referred to as "iir(k)". The DSP 65 stores these eight groups of data each composed of sixteen data iir(k) in the RAM 66. The DSP 65 also calculates delay factors dly7, dly6, dly5, dly4, ..., dly0 for the IIR filter based on time intervals from the point O of FIG. 4 to the first data of the respective data groups.

In the next Block 110, the DSP 65 sets the filter coefficients fir(k), iir(k) and the delay factors dly7, dly6, dly5, ..., dly 0 to the FIR filter 40 and the IIR filter 50 during a predetermined horizontal period within a vertical blanking period. More specifically, the filter coefficients fir(k) are set to the multipliers 46-0 to 46-15 of each of the transversal filters 43-0 to 43-3 as their multiplication factors. The delay factors dly7 to dly0 are set to the variable delay elements 53-7 to 53-0, respectively, and values having the same magnitudes as but opposite signs to the filter coefficients iir(k) are set to the multipliers 46·0 to 46-15 of each of the transversal filters 51-7 to 51-0 as their multiplication factors.

When the above processing has been completed, the program returns to Block 101, whereafter the same processing is repeated.

With this second embodiment, the filter coefficients can be set to the IIR filter 50 within a shorter time similarly to the aforesaid first embodiment.

Furthermore, the signal x(k) to be used for the calculation of the filter coefficients fir(k) and iir(k) is subjected to the high-frequency noise reduction based on the low-pass filter coefficients LPF(k), so that the ghost-canceling operation is more accurate.

In the embodiment shown in FIG. 7, the line memory 64 is provided on the output side of the FIR filter 40. Alternatively, in the case where the output of the FIR filter 40, to which the filter coefficients for the ghost cancellation have been set, are calculated by means of programs as in the above-described second embodiment, the line memory may be provided on the input side of the FIR filter 40 as indicated in the same FIGURE at 64' by a dotted line so that the waveform of the GCR signal is collected on the upstream side of the FIR filter 40. In this case, however, other filtering operations can not be effected on the received GCR signal with this FIR filter 40. If it is desired to collect the waveform of the received GCR signal after eliminating high-frequency noises therefrom, the line memory should preferably be provided on the downstream side of the FIR filter 40.

I claim:

1. A ghost cancellation circuit comprising a non-recursive and a recursive filter coupled to each other in a cascade fashion, said circuit further comprising:
    a first memory for storing a received ghost cancellation reference signal contained in an input video signal;
    a second memory in which a predetermined ghost cancellation reference signal has been stored;
    calculation means for calculating a first group of filter coefficients for the non-recursive filter based on said received ghost cancellation reference signal stored in said first memory and said predetermined ghost cancellation reference signal stored in said second memory, and for setting said first group of filter coefficients to the non-recursive filter;
    filtering means for causing said received ghost cancellation reference signal to be passed through the non-recursive filter, to which said first group of filter coefficients have been set, to thereby obtain a filtered ghost cancellation reference signal; and
    setting means for setting to the recursive filter, as a second group of filter coefficients, values corresponding respectively to time-series data representative of said filter ghost cancellation reference signal.

2. A ghost cancellation circuit according to claim 1, wherein said first memory comprises a waveform memory for storing a predetermined number of received ghost cancellation reference signals and a buffer memory for storing one received ghost cancellation reference signal which is obtained from said predetermined number of received ghost cancellation reference signals at least by subjecting these signals to an averaging processing, and in that said filtering means comprise switch means for selectively supplying said input video signal and the received ghost cancellation reference signal stored in said buffer memory to the non-recursive filter.

3. A ghost cancellation circuit according to claim 2, wherein said waveform memory is located on the output side of the non-recursive filter and in that when the received ghost cancellation reference signal is stored through the non-recursive filter in said waveform memory said non-recursive filter has been loaded with such a third group of filter coefficients that said non-recursive filter assumes a predetermined low-pass filtering characteristic.

4. A ghost cancellation circuit comprising a recursive filter and a non-recursive filter coupled to each other in a cascade fashion, said circuit further comprising:
    a first memory for storing a received ghost cancellation reference signal contained in an input video signal;
    a second memory in which a predetermined ghost cancellation reference signal has been stored;
    first calculation means for calculating a first group of filter coefficients for the non-recursive filter based on said received ghost cancellation reference signal stored in said first memory and said predetermined ghost cancellation reference signal stored in said second memory, and for setting said first group of filter coefficients to the non-recursive filter;
    second calculation means for calculating an output of the non-recursive filter, to which said first group of filter coefficients have been set, relative to said received ghost cancellation reference signal based on said received ghost cancellation reference signal and said first group of filter coefficients; and
    setting means for setting to the recursive filter, as a second group of filter coefficients, values corresponding respectively to time-series data representative of said calculated output of the non-recursive filter.

5. A ghost cancellation circuit according to claim 4, wherein said first memory is located on the input side of the non-recursive filter.

6. A ghost cancellation circuit according to claim 4, wherein said first memory is located on the output side of the non-recursive filter and in that when the received ghost cancellation reference signal is stored in said first memory said non-recursive filter has been loaded with such a third group of filter coefficients that said non-recursive filter assumes a predetermined low-pass filtering characteristic.

7. A ghost cancellation circuit comprising a non-recursive filter and a recursive filter coupled to each other in a cascade fashion said circuit comprising:
    a first memory disposed on the output side of the non-recursive filter for storing a received ghost cancellation reference signal contained in an input video signal passed through the non-recursive filter;
    a second memory in which a predetermined ghost cancellation reference signal has been stored;
    a third memory in which a first group of filter coefficients for giving the non-recursive filter a low-pass filtering characteristic, which substantially corresponds to a frequency characteristic of said predetermined ghost cancellation reference signal, have been stored;
    first setting means for setting said first group of filter coefficients to the non-recursive filter in synchronism with a timing at which the received ghost cancellation reference signal appears in said input video signal;

calculation means for calculating a second group of filter coefficients for the ghost cancellation in the non-recursive filter and a third group of filter coefficients for the ghost cancellation in the recursive filter based on said received ghost cancellation reference signal stored in said first memory and said predetermined ghost cancellation reference signal stored in said second memory; and setting means for setting said second group of filter coefficients and said third group of filter coefficients to the non-recursive filter and the recursive filter, respectively.

* * * * *